Oct. 15, 1929.  R. T. FRYE  1,732,160
PIPE CUTTER
Filed Nov. 18, 1927    2 Sheets-Sheet 1
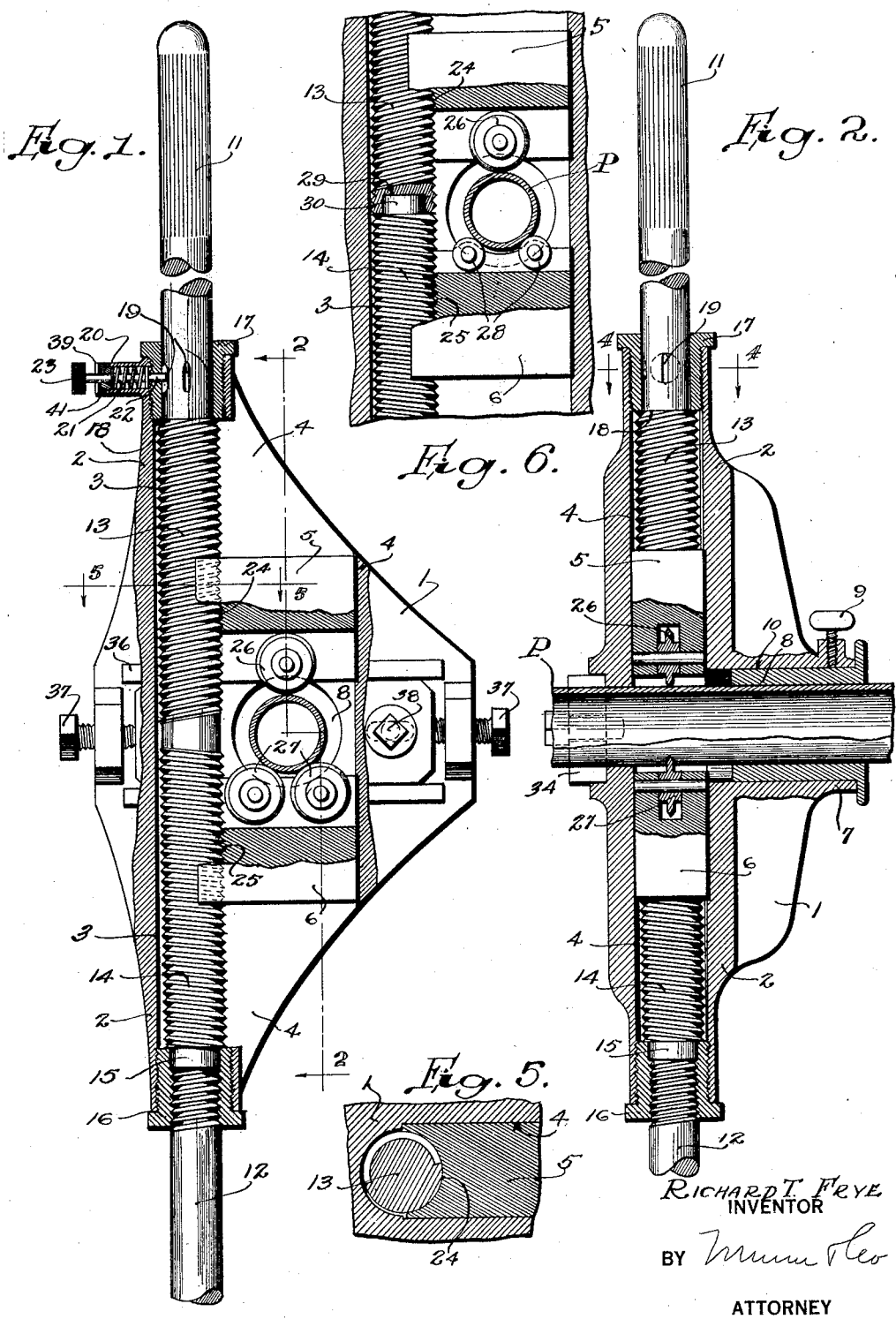
Richard T. Frye
INVENTOR
BY
ATTORNEY

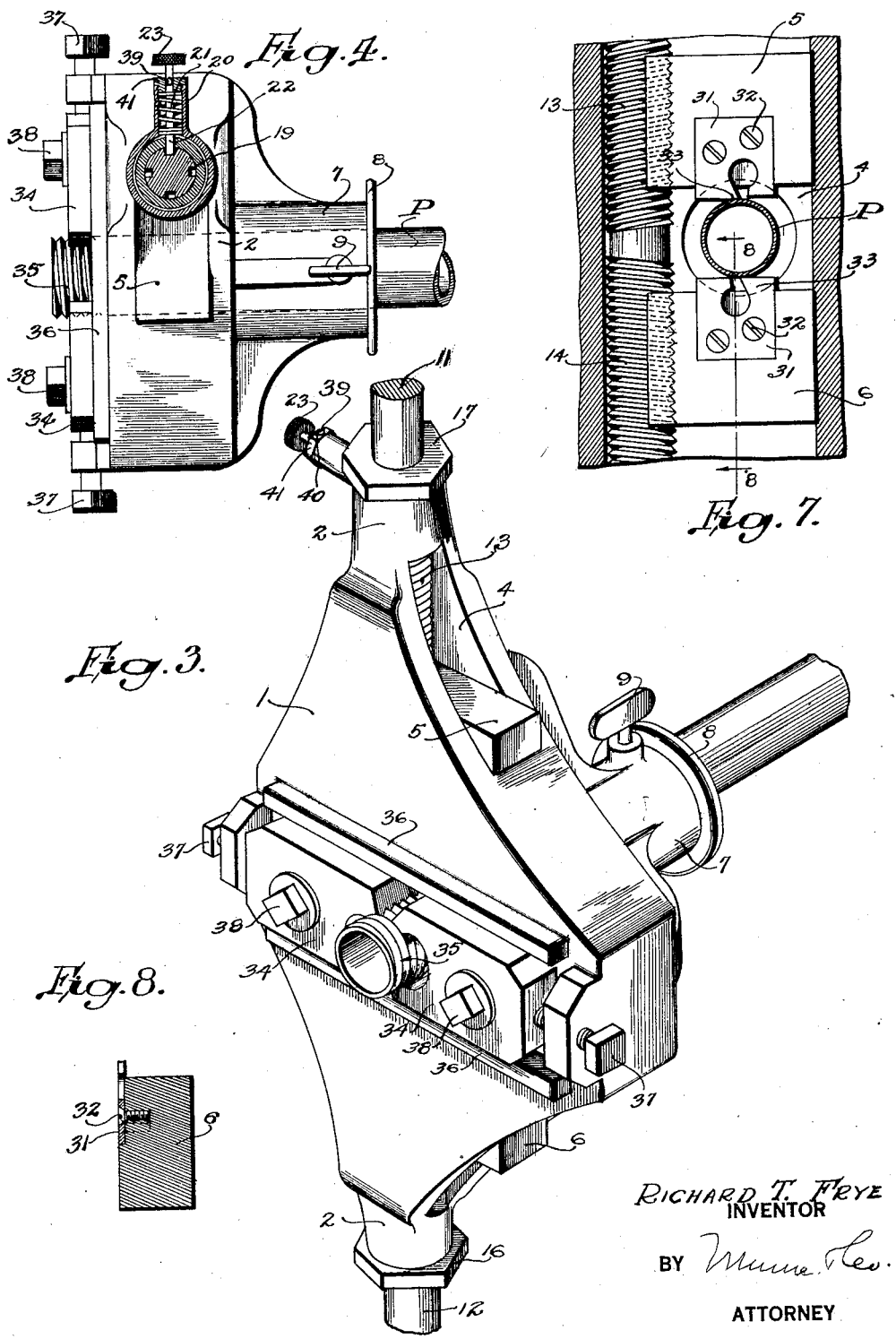

Patented Oct. 15, 1929

1,732,160

UNITED STATES PATENT OFFICE

RICHARD T. FRYE, OF BLAUVELT, NEW YORK

PIPE CUTTER

Application filed November 18, 1927. Serial No. 234,242.

This invention relates to improvements in pipe cutters, and it consists of constructions, combinations and arrangements herein described and claimed.

One of the outstanding objects of the invention is to provide means to advance the cutter or cutters of an implement for cutting pipe or other cylindrical objects during the act of turning the stock upon such pipe or cylindrical object, thus, in effect, bringing continuous cutting pressure to bear.

Other objects and advantages appear in the following specification, reference being had to the accompanying drawings, in which:

Figure 1 is a longitudinal section of the cutter stock,

Figure 2 is a section taken substantially on the line 2—2 of Figure 1,

Figure 3 is a perspective view of the cutter stock, portions of the handles being broken away, Figure 4 is a detail cross section taken on the line 4—4 of Figure 2, Figure 5 is a horizontal section on the line 5—5 of Figure 1, Figure 6 is a detail sectional view illustrating a slight modification wherein one of the cutter blocks is equipped with rollers rather than cutters, Figure 7 is a detail sectional view of a further modification wherein the circular cutters are replaced by knives, and Figure 8 is a detail cross section taken on the line 8—8 of Figure 7.

Those skilled in the art to which this particular invention relates are acquainted with the more or less commonly known forms of pipe cutters. These usually comprise an implement having a cutting element capable of being advanced toward the pipe by turning a handled screw. But in these pipe cutters the adjustments of the cutting element are made only from time to time, whereas, it is the purpose of the implement here described to make possible a substantially continuous application of the cutting pressure.

As will presently be brought out, this continuous cutting pressure may be developed as the cutter stock is rotated, the act of applying the pressure being incidental to the gripping motion of the user's hands upon the handles of the implement.

Reference is made to the drawings. The stock 1, herein known as the cutter stock, includes lateral extensions 2 provided with partial axial bores 3 which merge into a chamber 4 in which the cutter blocks 5 and 6 are movable. The cutter stock also has an extension 7 (Figs. 2 and 3) in which a tubular guide 8 is held by a set screw 9. Guides of various internal diameters may be fitted in the bore 10 of the extension in order to receive various pipe sizes.

Handles 11 and 12 protrude from the partial bores 3 of the lateral extensions 2. In the form of the invention in Figs. 1 and 2 the handle 11 is provided with right and left threads 13 and 14, it being obvious that these threads are cut on that part of the handle concealed within the stock 1. The inner extremity of the handle has a non-threaded or smooth tip 15 which has a bearing in a bushing 16 screwed into the adjacent extremity of the lateral extension 2. This bushing, in turn, is internally threaded to receive the screw end of the remaining handle 12. The handle 12 remains rigid but the handle 11 may be turned quite freely, the engagement of the smooth tip 15 providing one of the bearings.

The remaining bearing is formed by what may be termed a ratchet bushing 17. This bushing is screwed into the adjacent extremity of the remaining lateral extension 2, where it bears upon a shoulder 18 formed between the threads 13 and the reduced part of the handle 11. The portion of the handle concealed within the bushing 17 has notches forming teeth 19 (Fig. 4). The extension 2 has a housing 20 containing the spring 21 of a ratchet detent 22. The latter engages the teeth 19 at the inner extremity and on the outer extremity has an appropriate head 23 by which it may be pulled out of engagement with the teeth when required, as when necessary to reverse the detent prior to unscrewing the handle 11 and releasing the cutter wheels 26 and 27. At such time the detent 22 is given a half turn to reverse the position thereof in respect to the teeth 19. A stud 39, occupying slots 40 in the closure plug 41, keeps the detent in its two adjusted positions.

Upon reference to Fig. 1 it will be observed that the cutter blocks 5 and 6 have recesses 24 and 25 (see also Fig. 5) receiving the threaded portions 13 and 14 of the handle 11. These blocks are kept in engagement with the threaded portions by virtue of having bearing upon the opposite walls of the chamber 4. The carrier blocks 5 and 6 have working fits in the chamber 4 but the innermost wall provides a thrust bearing as later appears. The block 5 carries a single cutter wheel 26 while the block 6 carries a pair of cutter wheels 27.

From the arrangement in Fig. 1 it can be clearly seen that the gripping action of one of the hands of the operator in turning the stock 1 upon the pipe P when imposed in the proper direction, will cause the cutter wheels of the blocks 5 and 6 to continuously bear upon the pipe so that the cutting function of the wheels remains permanent and uniform throughout the cutting operation. The latter is an advantage that not only expedites the cutting of the pipe but produces a cleaner cut.

Figure 6 introduces a modification wherein the blocks 5 and 6 are caused to function in a somewhat different manner. The block 5 is still equipped with a single cutter wheel 26 but the block 6 is now provided with a pair of rollers 28 intended merely to bear or ride upon the outside of the pipe P without performing any cutting act. The inner threaded extremity 13 of the handle 11 (not shown) will be recognized.

But instead of being an integral part of the handle 11 the left hand threads 14 must now be regarded as being cut on the inner extremity of the remaining handle such, for example, as the handle 12 in Fig. 1. In other words, the modification in Fig. 6 employs a pair of handles that extend to the approximate center of the cutter stock, one of the extremities having right hand threads 13, the other extremity having left hand threads 14. It may be explained that in practice both threads may be right or left handed.

A recess 29 at the extremity of the threaded end 13 receives the tip 30 of the threaded end 14, the arrangement providing a bearing between the handles. In operation the block 6 is advanced by appropriately turning the handle bearing the threaded portion 14 until the rollers 28 engage the adjacent side of the pipe. The block 5 is similarly advanced by turning the handle having the threaded end 13 until the cutter wheel 26 engages the opposite side of the pipe.

The turning effort exercised upon the handle carrying the threaded end 13 during the turning of the cutter stock upon the pipe is continuously applied to the block 5 so that the cutter wheel 26 uniformly bears upon and bites into the pipe. The cutting action may be somewhat slower than that had with the arrangement in Fig. 1, but the same desired uniformity of application of the cutting pressure is obtained.

Fig. 7 illustrates a modification wherein the former cutter wheels and bearing rollers of the blocks 5 and 6 are replaced by blades or knives 31. These blades are secured, at 32, to the respective blocks. They have formations producing cutting edges 33 which act upon the pipe P in the manner already clearly understood. The threaded portions 13 and 14 are to be regarded as identical with the arrangement in Fig. 1. The gripping action upon one of the handles while turning the cutter stock will have the effect of causing the knives 31 of the blocks 5 and 6 to bear against the end cut into the pipe.

Figs. 1, 3 and 4 illustrate a structure that may briefly be alluded to although it has nothing to do with the invention. The front side of the stock 1 carries dies 34 by which the threads 35 are to be cut upon the extremity of the pipe. These dies move in guides 36 formed on the face of the stock, set screws 37 being provided for the purpose. The adjustments of the dies are fixed by lock screws 38.

The operation may be briefly reviewed although undoubtedly clear already to the reader. Considering the form of the invention in Fig. 1 it is readily seen that turning of the handle 11 in the proper direction will move the blocks 5 and 6 apart prior to the presentation of the stock to the pipe P to be cut. The handle 11 is then turned in the opposite direction so that the cutter wheels 26 and 27 are brought to bear against the pipe. Upon turning the stock 1 upon the pipe the natural gripping action upon the handle 11, if applied in the proper direction, will serve to keep the wheels 26 and 27 in tight engagement with the pipe. The cutting pressure is thus kept continuous with the advantageous result mentioned before. The same advantage is had when the cutter wheels are substituted by blades 31 as in Fig. 7 and the same continuity of pressure is had when only a single cutter wheel is made to function as in Fig. 6.

While the construction of the pipe cutter herein disclosed is that of a generally preferred form, obviously modifications may be made without departing from the spirit of the invention or the scope of the claims.

I claim:

1. A device of the character described comprising a stock, cutter blocks movably carried by the stock, handles intended to be grasped while turning the stock for the performance of the cutting action, and means associated with one of the handles and each of said cutter blocks for simultaneously moving all of the blocks by the action incident to the grasping of said handles while turning the stock.

2. An apparatus of the character described comprising a stock having a bore to receive a cylindrical object to be cut upon which object the stock may be turned, a pair of blocks carried by and guided upon the stock, each block having cutters and having threaded recesses, and a handle for turning the stock having oppositely threaded portions engaging the threaded recesses and moving the blocks along opposite directions of movement upon twisting the handle during the act of turning the stock.

3. An apparatus of the character described comprising a stock having a chamber, one wall of which forms a thrust bearing, blocks contained by the chamber and having threaded recesses at a side opposite to said wall, cutters carried by the blocks, a handle having oppositely threaded portions engaging the threads of said recesses and holding said blocks thrust against said wall, and means carried by the stock providing a swivel mounting for the handle permitting independent turning of the handle for simultaneously advancing the blocks and imposing uniform and continuous cutting pressure upon the object to be cut while turning the stock upon the latter.

4. An apparatus of the character described comprising a stock having partial bores communicating with a chamber, a pair of handles, one of said handles having oppositely threaded portions situated in said bores and confronting said chamber, the extremity of one of the threaded portions having a smooth tip, the extremity of the other threaded portion defining a shoulder, a bushing carried by the stock receiving the other handle as well as the smooth tip to define a bearing, a bushing carried by the stock engaging said shoulder and forming a second bearing, a pair of blocks situated in said chamber having appropriately threaded recesses receiving the threaded portions of said handle and being held in thrust bearing engagement with the opposite wall of the chamber, and a cutting element carried by said blocks.

5. A device of the character described comprising a stock, blocks contained by the stock and being movably guided therein, said blocks carrying elements for engaging a cylindrical object to be cut, said blocks having threaded recesses, and a pair of handles having swivel contact with each other, one of the handles having threaded portions in engagement with the blocks at said recesses.

Signed at city of Washington in the District of Columbia, this 15th day of November A. D. 1927.

RICHARD T. FRYE.